April 10, 1962 R. ADLER ET AL 3,029,308

SUBSCRIPTION TELEVISION SYSTEM

Filed Sept. 22, 1958 3 Sheets-Sheet 1

INVENTORS
Robert Adler
Walter S. Druz
BY Francis W. Crotty
ATTORNEY

INVENTORS
Robert Adler
Walter S. Druz
BY Francis W. Crotty
ATTORNEY

INVENTORS
Robert Adler
Walter S. Druz
BY Francis W. Crotty
ATTORNEY

United States Patent Office 3,029,308
Patented Apr. 10, 1962

3,029,308
SUBSCRIPTION TELEVISION SYSTEM

Robert Adler, Northfield, and Walter S. Druz, Bensenville, Ill., assignors to Zenith Radio Corporation, a corporation of Delaware Filed Sept. 22, 1958, Ser. No. 762,364
7 Claims. (Cl. 179—1.5)

This invention pertains to a subscription television system in which a television signal, developed at a transmitter, is coded or scrambled by a coding operation before transmission to authorized receivers, at each of which receivers a decoding operation takes place that is complementary to and synchronized with the coding operation at the transmitter. The invention may be practiced in either the transmitter or receiver portion of a subscription television system.

Subscription television systems have been developed wherein periodically actuated counting or cycling mechanisms, which execute a series of operating steps in a predetermined sequence in completing each cycle of operation, are employed to provide square-wave shaped encoding or control signals for controlling the mode-changing operation at transmitters and receivers, namely for determining the timing schedule in accordance with which a characteristic of a television signal is varied. To insure that a high degree of coding or scrambling complexity is achieved, various arrangements have been utilized to randomly actuate the counting mechanism during spaced intervals to interrupt or disrupt its regular cyclic operation. In this way, the square wave control signal is effectively phase modulated from time to time. Such arrangements are discussed and claimed, for example, in copending applications Serial No. 291,714, filed June 4, 1952, and issued April 21, 1959, as Patent 2,883,449, in the name of Carl G. Eilers et al.; Serial No. 310,309, filed September 18, 1952, in the name of Alexander Ellett; Serial No. 366,727, filed July 8, 1953, and issued September 16, 1958, as Patent 2,852,598, in the name of Erwin M. Roschke; Serial No. 374,716, filed August 17, 1953, and issued November 25, 1958, as Patent 2,862,048, in the name of Erwin M. Roschke; and Serial No. 370,174, filed July 24, 1953, and issued October 27, 1959, as Patent 2,910,526, in the name of Walter S. Druz, all of which are assigned to the present assignee.

The present invention also features a multi-step counting mechanism whose normal counting sequence is disrupted or interrupted from time to time but exhibits an additional degree of security in that during the spaced intervals in which interruption takes place a reverse counting operation is effected so that not only is the counting mechanism arrested in one of its counting states, but is "backed-up" or reversed to establish it in an earlier counting state in its sequence.

It is, accordingly, an object of the present invention to provide an improved subscription television system.

An arrangement, constructed in accordance with the present invention, may be employed in either the transmitter or receiver section of a subscription television system and comprises a secrecy device having at least two operating conditions each of which establishes the system in a different operating mode. A reversible counting mechanism, having at least one forward count input and at least one reverse count input, responds to a predetermined number of forward input pulses applied over its forward count input to execute a series of at least three operating steps in a predetermined forward sequence to complete a cycle of operation. The counting mechanism is subject to the application of successive pulses applied over its reverse count input to execute a series of operating steps in a sequence which is the reverse of the forward sequence to effectively vary the absolute number of forward input pulses required to complete an operating cycle. Means are provided for applying pulses to the forward count input and to the reverse count input. Additionally, there are means coupling the counting mechanism to the secrecy device to effect actuation thereof.

The features of this invention which are believed to be new are set forth with particularity in the appended claims. The invention itself, together with further objects and advantages thereof, may best be understood, however, by reference to the following description in conjunction with the accompanying drawings, in which:

Figure 1:
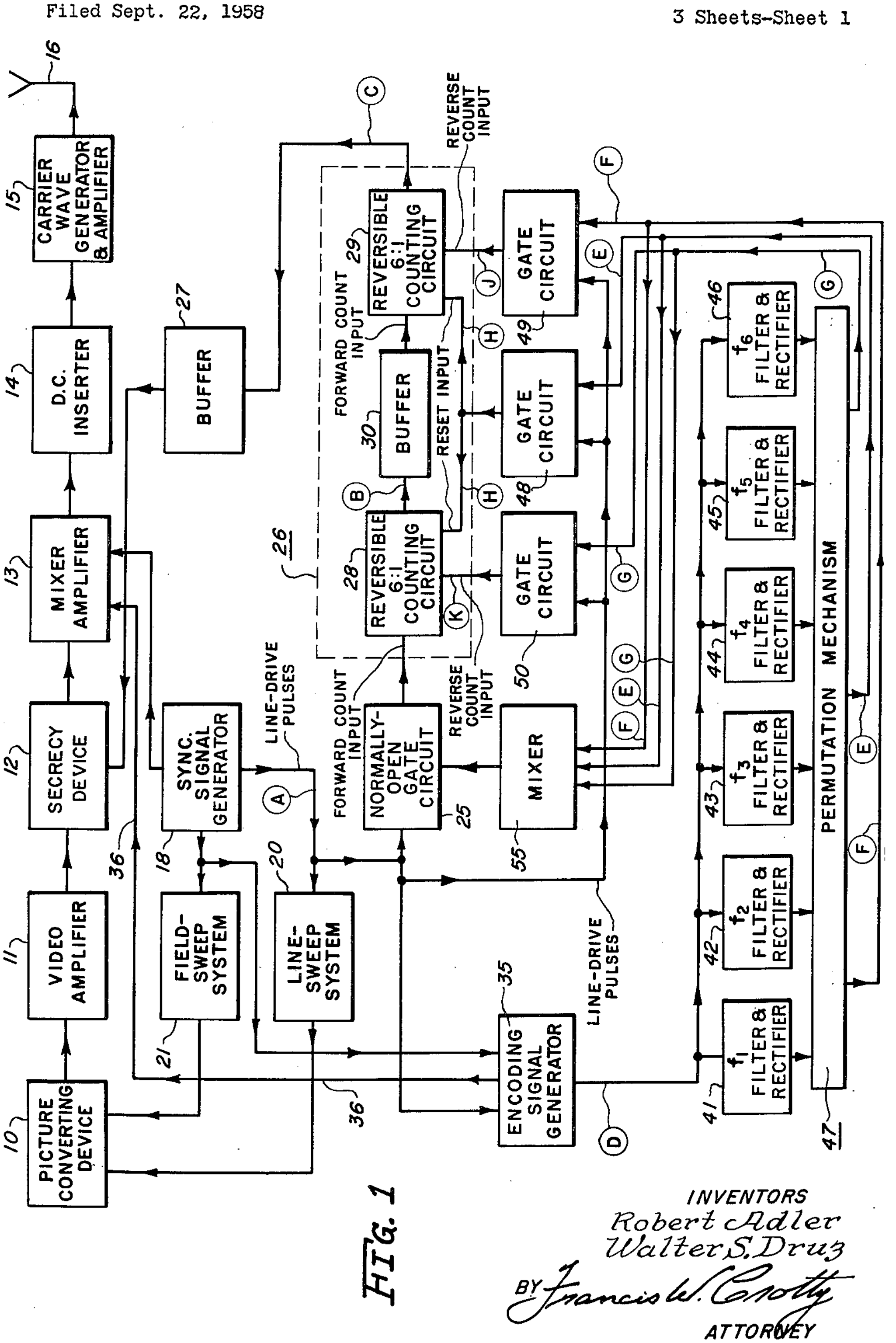
FIGURE 1 is a schematic representation of a subscription television transmitter constructed in accordance with one embodiment of the invention.

The transmitter of FIGURE 1 includes a picture converting device 10 which may take any one of several conventional forms in order to develop a video signal from an image to be televised. The output of image converter 10 is coupled through a video amplifier 11 to the input terminals of a secrecy device or coder 12, which may be constructed in accordance with the teachings of Patent 2,758,153, issued August 7, 1956, in the name of Robert Adler, and assigned to the assignee of the present application. Secrecy device 12 may comprise a beam-deflection tube having at least two target anodes to which video amplifier 11 may be selectively coupled in accordance with the deflected position of the beam. A time-delay network is connected in cascade with one of the target electrodes so that when the beam is incident upon that target, a delay is introduced into the video channel; otherwise it is not and the video signal is translated through coder 12 without any appreciable delay. An actuating or deflection-control signal, to be described, applied to the deflection electrodes of the beam switching device determines whether or not the delay network is functionally included in the video channel of the transmitter. The output terminals of unit 12 are connected to a mixer amplifier 13, the output terminals of which are coupled through a direct current inserter 14 to a carrier wave generator and modulator 15. The output terminals of unit 15 are connected to a suitable antenna 16.

The transmitter also includes a synchronizing signal generator 18 connected to mixer amplifier 13 to supply the usual line- and field-synchronizing pulses and associated pedestal pulses thereto. Generator 18 also supplies line- or horizontal-drive pulses to a line-sweep system 20 and field- or vertical-drive pulses to a field-sweep system 21 to synchronize the operation of these systems in well known fashion. The output terminals of sweep systems 20 and 21 are connected to line- and field-deflection elements (not shown) associated with device 10.

Generator 18 also supplies line-drive pulses through a normally-open gate circuit 25 to the input terminals of a reversible counting mechanism 26, the output terminals of which are connected to the beam-deflection elements of coder 12 through a buffer amplifier 27. Counting mechanism 26 includes two separate reversible counting circuits 28, 29 connected in cascade through an intermediate buffer amplifier 30, each of which counters may be of identical construction such that each effects a 6:1 count down or division of the number of input pulses with respect to the number of output pulses. Since the counters are in cascade, the total counting ratio for counting mechanism 26 is 36:1 and thus thirty-six steps are executed in advancing through each one of thirty-six states in completing each cycle of operation. Counting circuits 28 and 29 may take any one of several different forms, one of which is illustrated and described in detail in the paper entitled "Reversible Decade Counting Circuit" by Victor H. Regener, appearing on pages 375 and 376 of The Review of Scientific Instruments, volume 17, Number 10, October 1946.

The reversible counting circuit described in that publication includes an arrangement of ten stages including ten pentodes coupled together in ring counter fashion to provide a ten-step counter. There are thus ten counting states or conditions in each of which a unique combination of five of the pentodes are conducting or in their "on" conditions, the remaining five being cut off or nonconducting. A forward count input is provided, the application of pulses thereover advancing the counting circuit step-by-step from its instantaneous counting condition or state, whichever one that may be, through each one of the other states in a predetermined forward sequence. A reverse count input is also included in the counting circuit illustrated in the above mentioned Review of Scientific Instruments and responds to pulses applied over it to step the counting circuit from its instantaneous state to the next except in a sequence which is the reverse of the forward sequence. Of course, a slight modification is necessary to incorporate counting circuits, like that shown in the publication to which reference has been made, in the arrangement of FIGURE 1 since the counting ratios are different. All ten of the stages in the counting circuit are identical, and thus it is merely necessary to delete four of them while at the same time completing the ring circuit through the six stages remaining. It will be made apparent later that 6:1 counting ratios were selected for convenience of explanation.

Normally-open gate circuit 25 is specifically connected to the forward count input of reversible counting circuit 28 and the output of counting circuit 28 is connected to the forward count input of counting circuit 29.

In order to actuate the reverse count inputs of the counting circuits to achieve reversible operation thereof as distinguished from the forward operation caused by the application of pulses over the forward count inputs, an encoding signal generator 35 is provided having one input circuit connected to generator 18 to receive line-drive pulses therefrom and another input circuit also connected to generator 18 for receiving field-drive pulses. Generator 35 produces code components or signal bursts each of which is individualized with respect to the others to a certain extent in that each component exhibits a selected one of several predetermined identifying characteristics, such as frequency, and may be constructed in the manner disclosed and claimed in copending application Serial No. 486,135, filed February 4, 1955, and issued November 25, 1958, as Patent 2,862,049, in the name of Jack E. Bridges, and assigned to the present assignee. Generator 35 may also take the form of that described and claimed in copending application Serial No. 463,702, filed October 21, 1954, and issued August 2, 1960, as Patent 2,947,804, in the name of Carl E. Eilers et al., also assigned to the instant assignee.

As described in detail in the Eilers et al. application, Serial No. 463,702, now Patent No. 2,947,804, issued August 2, 1960, a combination of code signal bursts or components, individually having a predetermined identifying frequency, is developed during each of a series of spaced time intervals such as field-retrace intervals, and each combination may comprise a group of up to six bursts of up to six various signal frequencies, designated $f_1$–$f_6$, preferably randomly sequenced and randomly appearing within any such interval. Two or more components in any one given combination may have the same frequency. Moreover, when a combination does not include a total of six bursts, there may not be at the same time separation or spacing between the successive bursts, in that a "gap" or "void" may result.

The bursts or components from generator 35 individually occur in point of time between the line-synchronizing pulses occurring during the field-retrace intervals and are superimposed on the vertical blanking pulse of the composite signal for transmission to subscriber receivers, as represented schematically by conductor 36 connecting one pair of output terminals of generator 35 to mixer 13.

Another pair of output terminals of generator 35 are connected to each one of a series of six filter and rectifier units 41–46, frequency selective to frequencies $f_1$–$f_6$ respectively, to facilitate the separation of the bursts from one another for selective application to a series of six input circuits of an adjustable transposition or permutation mechanism 47, having a series of three output circuits. The input and output circuits of mechanism 47 may be considered code determining circuits between which mechanism 47 establishes different prescribed ones of a multiplicity of different interconnection patterns. This may be achieved by a family of switches, the adjustment of which selects the desired permutation patern between inputs and outputs. Suitable permutation or switching mechanisms for unit 47 that provide adequate degrees of security against unauthorized deciphering are disclosed, for example, in copending applications Serial No. 407,192, filed February 1, 1954, and issued December 30, 1958, as Patent 2,866,961, in the name of George V. Morris; Serial No. 419,301, filed March 29, 1954, and issued August 19, 1958, as Patent 2,847,768, in the name of Jack E. Bridges; Serial No. 490,078, filed February 23, 1955, and issued April 18, 1961, as Patent 2,980,-901, in the name of George V. Morris et al.; and Serial No. 555,541, filed December 27, 1955, and issued September 8, 1959, as Patent 2,903,686, in the name of Jack E. Bridges, all of which are assigned to the present assignee.

Permuting mechanism 47 is provided to permute applied rectified code signal components or bursts between its six input circuits and three output circuits in order that the code bursts developed in generator 35 may be further coded before they are used for coding. It is contemplated that this switching arrangement will be adjusted differently for each program for which a charge is to be assessed and that the permuting mechanism installed at each receiver within a given service area will require a different setting for any selected program, in order that each subscriber must obtain a new required switch setting for each different program.

The three output circuits of permutation mechanism 47 are connected to respective ones of a series of three normally-closed gate circuits 48–50 which are also supplied with line-drive pulses from synchronizing signal generator 18. The ouput terminals of gate circuit 48 are connected to reset inputs of counting circuits 28 and 29 in order to provide for simultaneous reset to predetermined, fixed reference conditions. The output of gate 49 is connected to the reverse count input of counter 29 and the output of gate 50 is connected to the reverse count input of reversible counter 28. The three output circuits of permutation mechanism 47 are also connected respectively to separate input circuits of a mixer 55, the single output of which is coupled to normally-open gate circuit 25 to provide a gating signal therefor.

Considering now the operation of the transmitter of FIGURE 1, picture converting device 10 develops a video signal representing the picture or image information to be televised and after amplification in amplifier 11 the video signal is translated through coder 12 to mixer amplifier 13 wherein it is combined with the customary field- and line-synchronizing and blanking pedestal pulses from synchronizing signal generator 18. Mixer 13 thereby develops a composite video signal which is applied through direct current inserter 14 to unit 15 wherein it is amplitude modulated on a picture carrier for transmission to subscriber receivers via antenna 16. Sweep systems 20 and 21 are synchronized by the line- and field-drive pulses from generator 18 in conventional manner.

Coding of the video signal is achieved by coder 12 under the influence of a deflection-control signal developed by reversible counting mechanism 26 for switching the beam of the beam-deflection tube in coder 12 back and forth between its two collector anodes in accordance with the pattern represented by the amplitude variations of the control signal. This actuation of secrecy device 12 varies the operating mode of the transmitter by modifying the time relation between the video and synchronizing components of the radiated signal and provides effective picture scrambling or coding.

Of course, the audio information may also be scrambled. The audio circuitry has been omitted, however, in order not to encumber the application needlessly.

In order to thoroughly analyze the operation of reversible counting mechanism 26, it is necessary to consider its makeup or composition and to make certain assumptions, namely to establish certain conventions, with respect thereto. As mentioned previously, for any given counting state or condition of the reversible counting circuit described in The Review of Scientific Instruments article, one half of the pentodes or stages are conducting or in an "on" condition, whereas the other half of the pentodes or stages are established in their non-conducting or "off" conditions. Since each of counting circuits 28 and 29 operates on a 6:1 ratio and therefore includes a total of only six stages with six pentodes, for any given counting state of each counter, half or three of the stages are conducting while the remaining three are cut off. It is now necessary to establish certain "ground rules" in order that the detailed analysis may proceed. The following table, designated Table I, establishes a convention with respect to the groups of three stages in each counting circuit 28, 29 which are conducting in each of the six counting states

*Table I*

| Counting States | 0 | 1 | 2 | 3 | 4 | 5 |
|---|---|---|---|---|---|---|
| 0 | + | + | + | − | − | − |
| 1 | − | + | + | + | − | − |
| 2 | − | − | + | + | + | − |
| 3 | − | − | − | + | + | + |
| 4 | + | − | − | − | + | + |
| 5 | + | + | − | − | − | + |

The stages of each counting circuit have been numbered 0–5, as shown in the top horizontal row, and the six counting states have also been numbered 0–5, as shown in the extreme left column. To avoid confusion between the six counting states of each counter 28, 29 and the thirty-six states of mechanism 26, "counting states" will be reserved for the individual counters and "operating states" will be utilized only in discussing the thirty-six states of mechanism 26.

Arbitrarily, it has been established that when stages 0–2 are not conducting in either one of counters 28, 29, the counting state will be designated 0. Stages 3–5 are thus all conducting and their anode voltages will necessarily be negative relative to the anode voltages of non-conducting stages 0–2. Therefore, the customary plus (+) signs and minus (−) signs have been employed in Table I to illustrate the various patterns of voltage conditions on the anodes of all the stages in each counting state. Since counting state 0 has been assumed to be that state in which stages 0–2 are non-conducting while stages 3–5 are conducting, + signs have been indicated under the three vertical columns for the 0–2 stage designations and − signs have been indicated under the columns for stages 3–5 in the horizontal line associated with counting state 0. Incidentally, counting state 0 is established as the reference state to which a transition is made responsive to the application of reset pulses.

Once this particular convention has been established, in response to applied forward input pulses the stages are rendered conductive in a regular sequence as the counting circuit is advanced through each one of its six counting states in the order established in Table I going from top to bottom. For example, when a counting circuit is actuated or stepped from counting state 0 to state 1, which of course would be caused by the application of a forward count input pulse, stage 0 is rendered conductive whereas stage 3 is cut off, stages 1 and 2 remaining non-conductive and stages 4 and 5 continuing to conduct. This set or pattern of voltage conditions is illustrated in the line in Table I associated with counting state 1. Actuation of either counting circuit 28 or 29 to its other counting states 3–5 results in different patterns of conducting and non-conducting stages and therefore voltage conditions, as shown by Table I.

Employing only one of counting circuits 28 or 29 and actuating it with periodically recurring line-drive pulses from generator 18 would result in the development of a square-wave signal, neglecting for the moment the effect of the code bursts from generator 35, having a frequency one-sixth that of the line-drive pulses, and each of the positive and negative pulse components of each of the square wave cycles would embrace three complete line-trace intervals. However, when two reversible counters are employed in cascade each exhibiting a 6:1 counting ratio, as in the illustrated embodiment of FIGURE 1, the resulting square wave from the second counter exhibits a frequency that is $\frac{1}{36}$ of the horizontal scanning rate, each of the positive and negative half cycles covering a period of eighteen line-trace intervals. Consequently, with the arrangement shown in FIGURE 1, during the field-trace intervals (when signal generator 35 is effectively inactive), the output of reversible counting mechanism 26 controls coder 12 through buffer 27 so that mode changes are made every eighteen line-trace intervals. Since a mode change is effected responsive to the execution of only one-half of the thirty-six operating steps of mechanism 26, each of the first and last series of eighteen steps may be considered a count registration, there being therefore two count registrations per complete operating cycle.

In the interest of providing a full understanding of the manner in which counting circuits 28 and 29 are effectively operating in reverse during the field-retrace intervals, it is expedient to consider the individual counting states assumed by each of counters 28 and 29 responsive to each one of the thirty-six operating steps of mechanism 26.

In considering each one of the thirty-six total operating steps, once again certain assumptions must be made. It will be assumed that the output of each of counting circuits 28, 29 is taken between the anode or plate of its stage 0 and the anode of its stage 3, and moreover, that reversible counter 29 is only actuated when the voltage at the anode of stage 0 of counter 28 becomes positive with respect to that on the anode of stage 3 of counter 28. Stated differently, a positive transition only from the plate of stage 0 carries. It will also be assumed that buffer 30 introduces no phase or polarity change. From Table I it will be observed that under this assumed convention reversible counter 29 will only be actuated when counter 28 is triggered from its counting state 3 to its counting state 4. Counter 29 is therefore actuated only once for each complete sequence of six counts or counting states of counting circuit 28, assuming that reversible counting mechanism 26 is under the control of only the line-drive pulses translated through normally-open gate circuit 25, namely during the field-trace intervals.

The following table, labeled Table II, is provided to indicate precisely what occurs in each one of the counting circuits 28, 29 as counting mechanism 26 advances step-by-step through each one of the series of thirty-six operating states in response to the execution of a corresponding series of thirty-six operating steps.

*Table II*

| Operating Steps | Transition of Counter 28 | Output Voltage Change on Anode of Stage 0 of Counter 28 | Transition of Counter 29 | Output Voltage Change on Anode of Stage 0 of Counter 29 |
|---|---|---|---|---|
| 1 | 5→0 | no change | 5 | no change. |
| 2 | 0→1 | neg. excursion | 5 | Do. |
| 3 | 1→2 | no change | 5 | Do. |
| 4 | 2→3 | do | 5 | Do. |
| 5 | 3→4 | pos. excursion | 5→0 | Do. |
| 6 | 4→5 | no change | 0 | Do. |
| 7 | 5→0 | do | 0 | Do. |
| 8 | 0→1 | neg. excursion | 0 | Do. |
| 9 | 1→2 | no change | 0 | Do. |
| 10 | 2→3 | do | 0 | Do. |
| 11 | 3→4 | pos. excursion | 0→1 | neg. excursion. |
| 12 | 4→5 | no change | 1 | no change. |
| 13 | 5→0 | do | 1 | Do. |
| 14 | 0→1 | neg. excursion | 1 | Do. |
| 15 | 1→2 | no change | 1 | Do. |
| 16 | 2→3 | do | 1 | Do. |
| 17 | 3→4 | pos. excursion | 1→2 | Do. |
| 18 | 4→5 | no change | 2 | Do. |
| 19 | 5→0 | do | 2 | Do. |
| 20 | 0→1 | neg. excursion | 2 | Do. |
| 21 | 1→2 | no change | 2 | Do. |
| 22 | 2→3 | do | 2 | Do. |
| 23 | 3→4 | pos. excursion | 2→3 | Do. |
| 24 | 4→5 | no change | 3 | Do. |
| 25 | 5→0 | do | 3 | Do. |
| 26 | 0→1 | neg. excursion | 3 | Do. |
| 27 | 1→2 | no change | 3 | Do. |
| 28 | 2→3 | do | 3 | Do. |
| 29 | 3→4 | pos. excursion | 3→4 | pos. excursion. |
| 30 | 4→5 | no change | 4 | no change. |
| 31 | 5→0 | do | 4 | Do. |
| 32 | 0→1 | neg. excursion | 4 | Do. |
| 33 | 1→2 | no change | 4 | Do. |
| 34 | 2→3 | do | 4 | Do. |
| 35 | 3→4 | pos. excursion | 4→5 | Do. |
| 36 | 4→5 | no change | 5 | Do. |

From Table II it may be noted that an additional assumption has been made; it has been assumed that both counters 28 and 29 are established in their individual counting states 5 immediately prior to the first operating step. It will also be observed that, as in the case of counter 28 and as mentioned before, the output voltage from counter 29 is developed at the anode of its stage 0 with respect to the voltage on the anode of its stage 3.

The two vertical columns in Table II representing the transitions or triggering actions of the counters depict both the instantaneous counting state and the state assumed by each counter responsive to each of the thirty-six operating steps. Having assumed that counter 28 is established in its counting state 5 immediately prior to the first step, if a forward count input pulse is applied to counter 28 operating step 1 is executed, resulting in the establishment of counter 28 in its state 0. Successive pulses applied over the forward count input of counter 28 result in the advancement of mechanism 26 through its entire sequence of thirty-six steps, counter 28 repeatedly cycling through its individual counting states 0–5 in that order. For the entire thirty-six steps, counter 28 cycles through its six counting states a total of six times.

From Table I it will be noted, under the vertical column devoted to the voltage condition of the anode of stage 0, that the output voltage of counter 28 undergoes a negative amplitude excursion when changing from counting state 0 to state 1 and, as mentioned before, a positive amplitude variation when going from state 3 to state 4, the output voltage remaining at its instantaneous level for all other transitions. Consequently, and as is illustrated in Table II, negative excursions at the output of counter 28 occur responsive to the 2nd, 8th, 14th, 20th, 26th and 32nd operating steps, while on the other hand positive excursions in the output voltage occur responsive to the 5th, 11th, 17th, 23rd, 29th and 35th steps.

In view of the fact that, as mentioned before, counter 29 is only triggered in response to a positive excursion of its input voltage, which of course is the same as the output voltage of counter 28 since buffer 30 introduces no polarity change, counter 29 assumes a different counting state responsive only to the 5th, 11th, 17th, 23rd, 29th and 35th operating steps. Of course, each time it is triggered, counter 29 assumes the next counting state in the sequence from 0 to 5 and then back to 0, as is the case with the cyclic operation of counter 28.

Since Table I also applies to counter 29, a negative amplitude excursion of the voltage at the anode of its stage 0 occurs only in response to a transition from its 0 counting state to its counting state 1, while positive excursions result when counter 29 assumes its counting state 4 from state 3, the output voltage remaining at its instantaneous value or level responsive to all other transitions. Consequently, the output voltage of the entire counting mechanism 26 undergoes a negative amplitude change only responsive to the 11th operating step and a positive amplitude change responsive to the 29th step, no changes being made responsive to any other steps.

Figure 3:
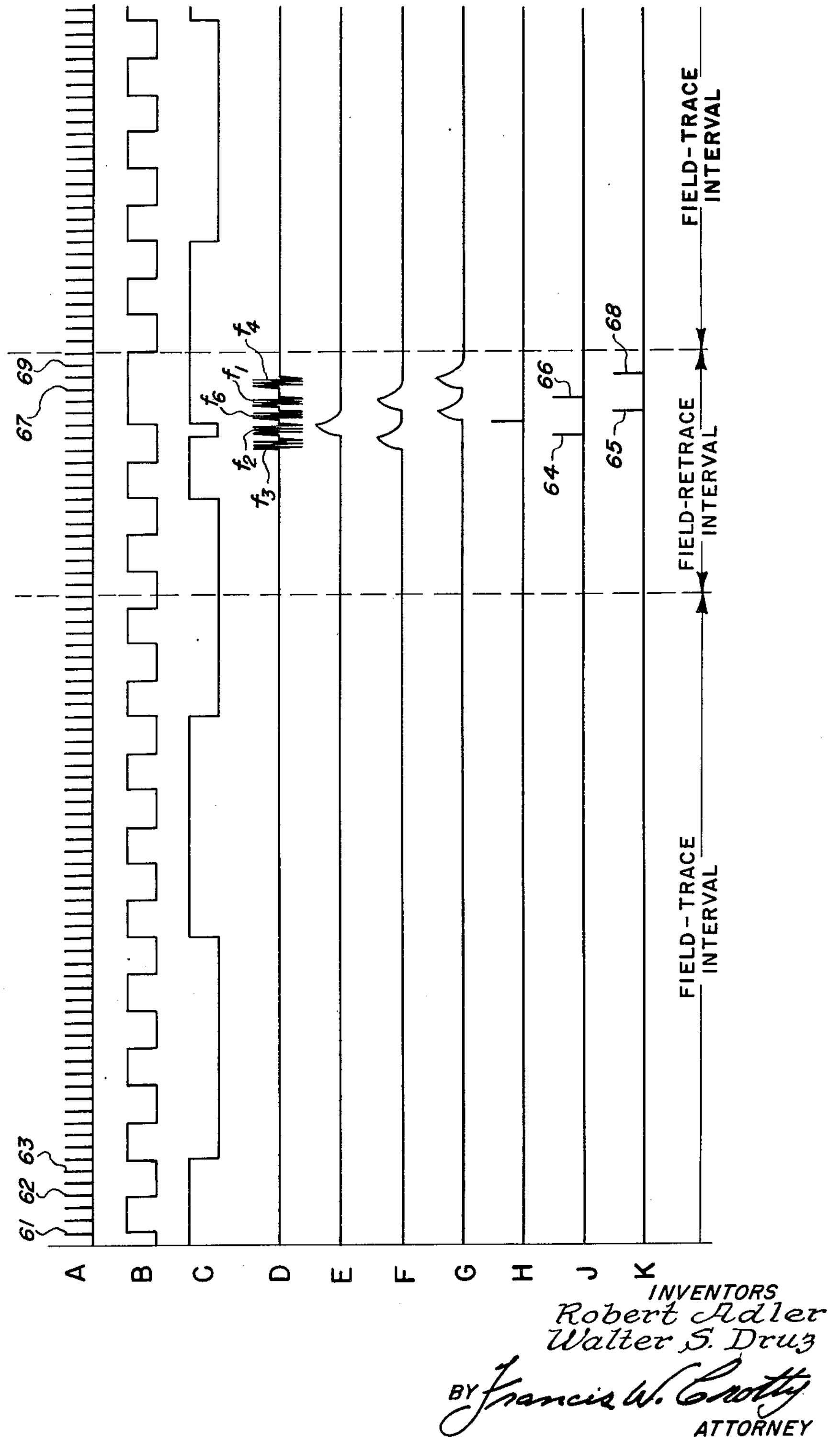

Attention is directed to the wave forms of FIGURE 3, particularly those two portions falling within the intervals each designated "field-trace interval," namely the intervals to the left and to the right of the designated "field-retrace interval" which illustrate graphically the periodic or cyclic operation of mechanism 26. Curve A represents the periodically recurring line-drive pulses supplied through gate circuit 25 to the input of counting circuit 28, which responds thereto to produce the square wave signal of curve B which, in turn, is applied to counter 29 to develop the signal of curve C for application to coder 12. In closely observing wave forms B and C in comparison with Table II, it will be noted that the conventions and assumptions previously established have been consistently adhered to.

The beginning of curves B and C (namely, that on the extreme left) represents the condition of counting mechanism 26 just subsequent to the fourth operating step. Counter 28 is therefore established in its counting state 3 to provide a negative output voltage and counter 29 in its counting state 5 to provide a positive output voltage. Responsive to the very first line-drive pulse of curve A, namely pulse 61, counter 28 executes a forward step to its counting state 4 (the entire mechanism 26 executing operating step 5), resulting in a positive excursion in its output voltage as indicated in curve B at that instant, the voltage from counter 29 remaining positive even though counter 29 moves to its counting state 5. The next two line-drive pulses of curve A advance mechanism 26 through its 6th and 7th operating states, counter 28 being triggered first to its counting state 5 and then to its counting state 0, waveforms B and C remaining unchanged. The next line-drive pulse, designated 62, triggers counter 28 from its counting state 0 to state 1 in executing operating step 8 and in so doing a negative excursion results in the output voltage as shown in curve B, counter 29 continuing in its state 0. The next two line-drive pulses of curve A result in execution of operating steps 9 and 10 to advance counter 28 to its second state and then to its counting state 3 without changing the level of the output voltage, but the following line-drive pulse, designated 63, results in the carrying out of the 11th operating step and this produces a positive excursion in curve B and a negative excursion in curve C, counter 29 being changed at that time from its counting state 0 to its counting state 1. The succeeding portions of curves B and C during the field-trace intervals may be similarly analyzed.

In order to interrupt the cyclic actuation of mechanism 26 and thus to disrupt the resulting periodic mode changing pattern imparted to the video signal in the interest of increasing the complexity of the coding schedule, a combination of code signal bursts or components, like that shown in curve D, each burst exhibiting one of frequencies $f_1$–$f_6$, is developed in generator 35 during a portion of each field-retrace interval. The bursts are separated from one another and rectified in units 41–46 for individual application to the various input circuits of permutation mechanism 47. This mechanism may establish any one of a multitude of circuit connections between its input circuits and output circuits so that the rectified code components are supplied to normally-closed gate circuits 48–50, with a distribution depending on the instantaneous setting of mechanism 47. In this way, the code components of frequencies $f_1$–$f_6$ are effectively permuted.

For purposes of illustration, it will be assumed that switching mechanism 47 is so adjusted that rectified bursts of frequency $f_2$ are applied to gate 48, that rectified bursts of frequencies $f_3$ and $f_1$ are supplied to gate circuit 49, and that rectified bursts of frequencies $f_4$ and $f_6$ are applied to gate circuit 50. With the assumed typical combination of bursts as shown in curve D, individually exhibiting the indicated frequencies, wave forms E, F and G are therefore applied to gates 48—50, respectively.

Gate circuits 48–50 also receive line-drive pulses from generator 18 and gate in those of the line-drive pulses that occur in time coincidence with the rectified code bursts to the reverse and reset inputs of counters 28 and 29. The pulse of curve H is thus applied to the reset input of each counter, the pulses of curve J to the reverse input of counter 29, and the pulses of curve K are supplied to the reverse count input of counter 28.

The rectified envelopes shown in curves E–G are all applied to mixer 55 wherein they are added to produce a composite gating signal for application to gate circuit 25. Since the rectified pulses of curves E–G are employed to gate in line-drive pulses to counting circuits 28 and 29 to effect their operation, it is expedient to cut off or block the application of the regular periodically recurring line-drive pulses to the forward count input of counter 28 at those instants. Thus, gate 25 is effectively closed by the pulses of curves E–G.

In determining the specific effect of the pulses of curves H–K, it is necessary to first determine the specific counting state in which each of counters 28 and 29 is established. From the analysis previously made of curves B and C during the time interval embraced by pulses 61 and 63 of curve A and by referring to Table II, it may be determined that just prior to the first pulse of curve J, designated 64, counter 28 is in its counting state 2 and counter 29 is established in its counting state 4. In other words, mechanism 26 has already completed its operating step 33 but has not yet executed operating step 34. Since pulse 64 of curve J is applied to the reverse count input of counter 29, that counter retreats or steps back from its counting state 4 to its counting state 3 and thus undergoes a negative voltage change at that time. In view of the fact that the pulses of curves E–G prevent the translation of line-drive pulses to the forward count input of counting circuit 28 during the occurrence of the pulses of curves H–K, reversible counter 28 remains in its counting state 2 during the line-trace interval immediately following pulse 64.

The single pulse of curve H, being applied to the reset input of each of the counters, effectively triggers each counter to its respective reference counting state, which has been assumed to be counting state 0 in the present discussion. Thus, during the line-trace interval immediately following the pulse of curve H, each of counters 28 and 29 is established in its counting state 0. In going from state 2 to state 0 the output of counter 28, namely curve B, undergoes a positive amplitude. Similarly, the output voltage of unit 29 also executes a positive excursion as may be noted in curve C.

Responsive to the application of the first pulse, designated 65, of curve K to the reverse count input of counter 28, counting circuit 28 backs up or reverses from state 0 to state 5. As may be observed in Table II, the output voltage in both states 0 and 5 is the same and thus curve B does not undergo an amplitude change in response to pulse 65. Counter 29, of course, remains in its state 0.

Pulse 66 of curve J is applied to the reverse count input of counter 29 and since that pulse finds counter 29 established in its counting state 0 effects a step backwards so that counter 29 assumes its counting state 5. Incidentally, it should be appreciated that even though counting circuit 29, when actuated by means of a pulse applied over its reverse count input, retreats only one counting state in a reverse sequence, the result felt on the entire mechanism 26, which collectively has thirty-six operating states, is to step the mechanism back a total of six of the thirty-six states. Thus, the intermediate states are effectively skipped over.

Since the particular combination of bursts of curve D has a gap between the pulse of frequency $f_1$ and that of frequency $f_4$, pulse 67 of curve A is permitted to pass through gate 25 and counting circuit 28 is triggered in a forward direction from its instantaneous state, which is state 5, to state 0. Once again, since the output voltage of counter 28 is the same for both states 5 and 0, no amplitude variation results in the signal of curves B in response to pulse 67. Counter 29, of course remains in its state 5.

Pulse 68 of curve K is applied over the reverse count input of counting circuit 28 and since the counter is established in its counting state 0 at that time, a reverse step is executed and thus counter 28 ends up in its counting state 5. Again, due to the similar voltage level for states 0 and 5, no amplitude variation results in the signal of curve B responsive to pulse 68.

Thus, upon the conclusion of the combination of code components of curve D and consequently the code pulses of curves H–K, both counters 28 and 29 are established in their respective counting states 5. Referring to Table II, it will be noted that this condition is identical to that which exists immediately subsequent to the execution of operating step 36. Thus, upon the arrival of line-drive pulse 69 of curve A, step 1 is initiated. The pulses of curve A following pulse 69 cause sequential operation of mechanism 26 through the thirty-six operating steps as described before, and thus the cyclic operation is resumed following the field-retrace interval illustrated. Since the code components are preferably randomly sequenced, the cyclic actuation of mechanism 26 has been successfully disrupted such that upon the termination of the combination of code bursts of Code D the counting circuitry is established in a different operating state from that in which it would be established if the periodic actuation had not been interrupted. The control signal of curve C employed for coding thus constitutes a square wave which is phase modulated during field-retrace intervals.

In order that a subscriber may utilize the coded transmission, it is necessary that each combination of code signal components be made known to the subscriber receivers. This is achieved by applying the bursts of curve D to mixer amplifier 13 to be combined with the composite video signal for transmission to the subscriber receivers. The signal bursts must not disturb the sweep systems of the subscriber receivers and to that end the amplitude level of the blanking pulse is modified to effect an inward modulation by the code signal components.

By way of summary, coder 12 constitutes a secrecy device having at least two operating conditions each of which establishes the system in a different operating mode, namely each of which introduces a different time relationship between the video and synchronizing components. Reversible counting mechanism 26, which is actually made up of two cascade connected reversible counters 28, 29 and buffer 30, has at least one forward count input (for example, that of counter 28) and at least one reverse count input (for example, that of counter 29), and responds to a predetermined number, specifically thirty-six, of forward input pulses applied over the forward count input of counter 28 to execute a series of thirty-six operating steps, namely to advance step-by-step through each one of thirty-six different operating states, in a predetermined forward sequence to complete a cycle of operation. However, mechanism 26 also responds to the application of successive pulses applied over the reverse count input of counter 29 to execute a series of operating steps in a sequence which is the reverse of the forward sequence to effectively vary the absolute number of forward input pulses required to complete an operating cycle. Generator 18, gate 25 and its coupling circuitry to counter 28 constitutes means for applying pulses to the forward count input and the circuitry coupled to the reverse input of counter 29 may be considered means for applying pulses to the reverse count input. The coupling circuitry including buffer 27 between counter 29 and coder 12 constitutes means coupling the counting mechanism to the secrecy device to effect actuation thereof.

Figure 2:
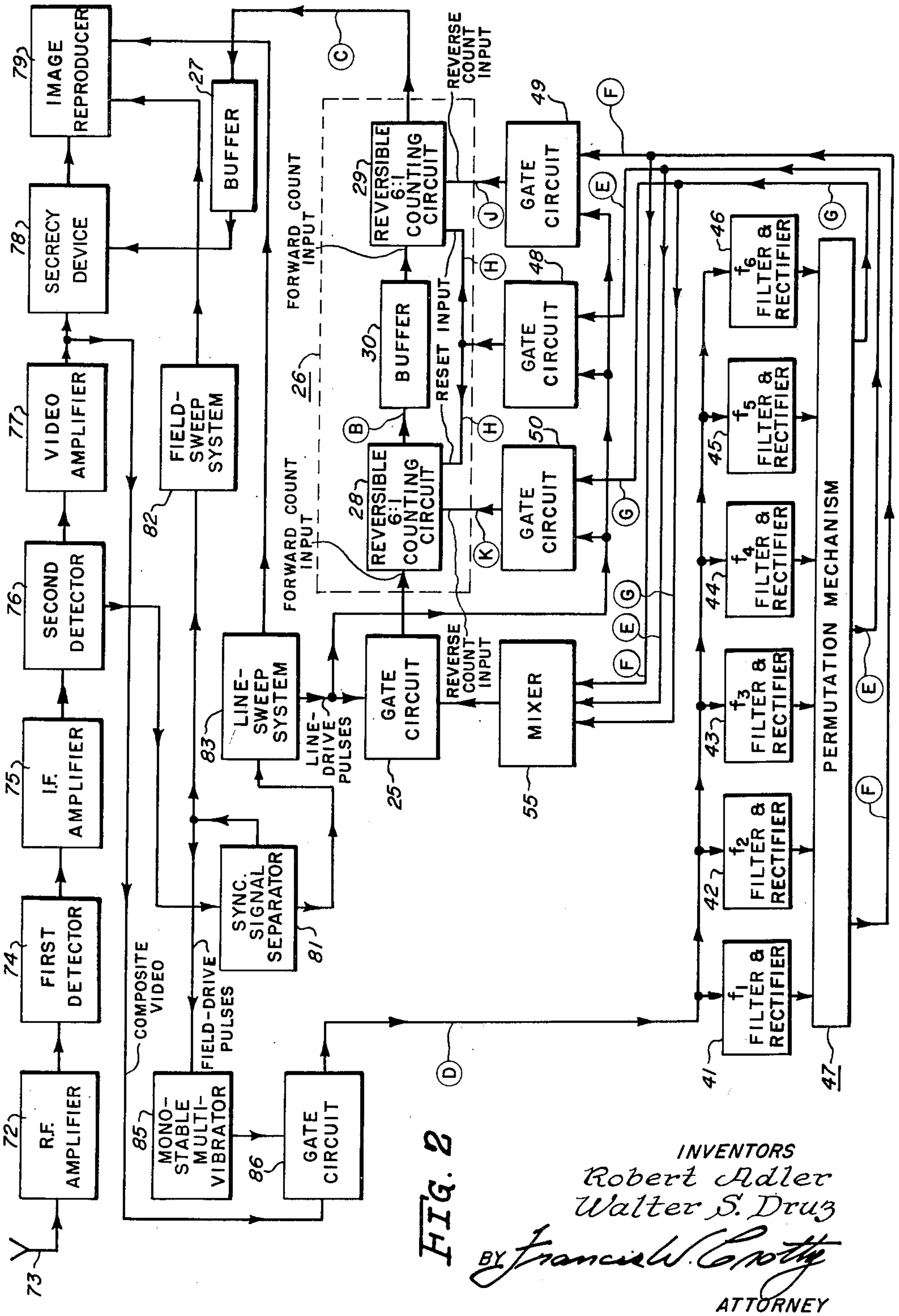
FIGURE 2 represents a subscription television receiver for operation in conjunction with the transmitter of FIGURE 1 and includes an arrangement constructed in accordance with another embodiment of the invention; and, FIGURE 3 illustrates various idealized signal wave forms useful in explaining the operation of the transmitter of FIGURE 1 and the receiver of FIGURE 2.

The receiver of FIGURE 2 has been constructed in accordance with the invention to decode especially the coded television signal developed in the transmitter of FIGURE 1. A radio frequency amplifier 72 has its input terminals connected to an antenna 73 and its output circuit connected to a first detector 74, which in turn is connected through an IF amplifier 75 to a second detector 76. This detector is coupled through a video amplifier 77 and a secrecy device or decoder 78 to the input terminals of an image reproducing device or picture tube 79. Decoding device 78 may be identical in construction to coder 12 in the transmitter except that it is controlled to operate in a complementary fashion in order to compensate for variations in the timing of the video and synchronizing components of the received television signal. Specifically, when a delay is introduced at the transmitter between the occurrence of a radiated line-drive pulse and the video information occurring during the intermediately succeeding line-trace interval, that video signal is translated through decoding device 78 with no delay, whereas when no delay is introduced at the transmitter a delay is imparted to the video signal in secrecy device 78.

Detector 76 is also coupled to a synchronizing signal separator 81 which is connected to the usual field-sweep system 82 and line-sweep system 83 connected in turn to the deflection elements (not shown) associated with reproducing device 79. In order to facilitate the separation of the code signal bursts or components from the composite television signal, namely the bursts like those shown in curve D, a mono-stable multivibrator 85 is connected to separator 81 to receive field-drive pulses therefrom and the output of the multivibrator is coupled to one input of a normally-closed gate 86, another input of which is coupled to amplifier 77 to receive the composite video signal. Gate circuit 86 is therefore in a sense the counterpart of generator 35 in that both units develop at their output terminals the code components like those shown in curve D. Accordingly, the output of gate circuit 86 is connected to a series of filter and rectifier units 41–46 which correspond to the identically numbered elements in the transmitter. In fact, the remaining circuitry in FIGURE 2 is identical in construction and arrangement with the correspondingly numbered units in the transmitter of FIGURE 1. The only difference is that while gate circuit 25 in the transmitter receives line-drive pulses from the synchronizing signal generator, gate circuit 25 in the receiver of FIGURE 2 receives line-drive pulses from line-sweep system 83.

In the operation of the described receiver, the coded television signal is intercepted by antenna 73, amplified in radio frequency amplifier 72 and heterodyned to the appropriate intermediate frequency of the receiver in first detector 74. The resulting intermediate frequency signal is amplified in intermediate frequency amplifier 75 and detected in second detector 76 to produce a coded composite video signal which is then amplified in video amplifier 77 and translated through decoding device 78 to the input terminals of image reproducer 79 to control the intensity of the cathode ray beam in that reproducer in conventional fashion. The synchronizing components are separated in separator 81 and utilized to control the sweep functions in a customary manner.

Mono-stable multivibrator 85 responds to field-drive pulses to produce gating pulses each having a duration sufficient to embrace the time interval in which the code signal components appear during each field-retrace interval, the parameters of unit 85 being appropriately selected, and thus those components are gated in by gate 86 for application to the filter and rectifier units 41–46. Decoding at the receiver is accomplished in the identical manner explained hereinbefore in connection with the encoding operation at the transmitter. Accordingly, the wave form presentations in FIGURE 3 are also applicable to the receiver of FIGURE 2.

Reversible counting mechanism 26 in the receiver therefore develops a deflection-control signal at its output terminals which undergoes amplitude excursions in exact synchronism with the output signal of the corresponding mechanism at the transmitter. This signal is applied to secrecy device 78 to effect actuation thereof in time coincidence with, but in a complementary sense to, the actuation of secrecy device 12 at the transmitter so that the video signals applied to the input electrodes of image reproducer 79 are suitably compensated to effect intelligible image reproduction.

While particular embodiments of the invention have been shown and described, modifications may be made and it is intended in the appended claims to cover all such modifications as may fall within the true spirit and scope of the invention.

We claim:

1. A subscription television system comprising: a secrecy device having at least two operating conditions each of which establishes said system in a different operating mode; a reversible counting mechanism, having at least one forward count input and at least one reverse count input, responding to a predetermined number of forward input pulses applied over said forward count input to execute a series of at least three operating steps in a predetermined forward sequence to complete a cycle of operation but subject to the application of successive pulses applied over said reverse count input to execute a series of operating steps in a sequence which is the reverse of said forward sequence to effectively vary the absolute number of forward input pulses required to complete an operating cycle; means for applying pulses to said forward count input and to said reverse count input; and means coupling said counting mechanism to said secrecy device to effect actuation thereof.

2. A subscription television system comprising: a secrecy device having at least two operating conditions each of which establishes said system in a different operating mode; a reversible counting mechanism, having at least one forward count input and a plurality of reverse count inputs, responding to a predetermined number of forward input pulses applied over said forward count input to execute a series of at least three operating steps in a predetermined forward sequence to complete a cycle of operation but subject to the application of successive pulses applied over each of said reverse count inputs to execute a series of operating steps in a sequence which is the reverse of said forward sequence to effectively vary the absolute number of forward input pulses required to complete an operating cycle; means for applying pulses to said forward count input and to said reverse count inputs; and means coupling said counting mechanism to said secrecy device to effect actuation thereof.

3. A subscription television system comprising: a secrecy device having at least two operating conditions each of which establishes said system in a different operating mode; a reversible counting mechanism, having at least one forward count input and at least one reverse count input, responding to a predetermined number of forward input pulses applied over said forward count input to execute a series of at least three operating steps in a predetermined forward sequence to register a preselected count but subject to the application of successive pulses applied over said reverse count input to execute a series of operating steps in a sequence which is the reverse of said forward sequence to effectively vary the absolute number of forward input pulses required to effect said prescribed count registration; means for applying pulses to said forward count input and to said reverse count input; and means coupling said counting mechanism to said secrecy device to effect actuation thereof from one to another of its aforesaid operating conditions at spaced intervals determined by each count registration of said counting mechanism.

4. A subscription television system comprising: a secrecy device having at least two operating conditions each of which establishes said system in a different operating mode; a reversible counting mechanism, having at least one forward count input and at least one reverse count input, responding to a predetermined number of forward input pulses applied over said forward count input to advance step-by-step through each one of a series of at least three operating states in a predetermined forward sequence to complete a cycle of operation but subject to the application of successive pulses applied over said reverse count input to retreat back step-by-step through only selected ones and less than all of said operating states, skipping over at least one operating state in each step, in a sequence which is the reverse of said forward sequence to effectively vary the absolute number of forward input pulses required to complete an operating cycle; means for applying pulses to said forward count input and to said reverse count input; and means coupling said counting mechanism to said secrecy device to effect actuation thereof.

5. A subscription television system comprising: a secrecy device having at least two operating conditions each of which establishes said system in a different operating mode; a reversible counting mechanism, having at least one forward count input and a plurality of reverse count inputs, responding to a predetermined number of forward input pulses applied over said forward count input to advance step-by-step through each one of a series of operating states in a predetermined forward sequence to complete a cycle of operation but subject to the application of successive pulses applied over one of said reverse count input to retreat back step-by-step through at least certain ones of said operating states in a sequence which is the reverse of said forward sequence to effectively vary the absolute number of forward input pulses required to complete an operating cycle, and subject to the application of successive pulses applied over another one of said reverse count inputs to retreat back step-by-step through only selected ones and less than all of said operating states, skipping over at least one operating state in each step, in a sequence which is the reverse of said forward sequence to effectively vary the absolute number of forward input pulses required to complete an operating cycle; means for applying pulses to said forward count input and to said reverse count inputs; and means coupling said counting mechanism to said secrecy device to effect actuation thereof.

6. A subscription television system comprising: a secrecy device having at least two operating conditions each of which establishes said system in a different operating mode; a reversible counting mechanism, having at least one forward count input and at least one reverse count input, responding to a predetermined number of forward input pulses applied over said forward count input to execute a series of at least three operating steps in a predetermined forward sequence to complete a cycle of operation but subject to the application of successive pulses applied over said reverse count input to execute a series of operating steps in a sequence which is the reverse of said forward sequence to effectively vary the absolute number of forward input pulses required to complete an operating cycle; means for applying periodically recurring pulses to said forward count input; means for applying code pulses, occurring in accordance with a secret code schedule, to said reverse count input; and means coupling said counting mechanism to said secrecy device to effect actuation thereof.

7. A subscription television system comprising: a secrecy device having at least two operating conditions each of which establishes said system in a different operating mode; a reversible counting mechanism, having at least one forward count input and a plurality of reverse count inputs, responding to a predetermined number of forward input pulses applied over said forward count input to execute a series of operating steps in a predetermined forward sequence to complete a cycle of operation but subject to the application of successive pulses applied over each of said reverse count inputs to execute a series of operating steps in a sequence which is the reverse of said forward sequence to effectively vary the absolute number of forward input pulses required to complete an operating cycle; means for applying periodically recurring pulses to said forward count input; means for deriving a plurality of code components each of which is individualized with respect to the others in that each exhibits a predetermined unique identifying characteristic; means responsive to said identifying characteristics for separating said code components from one another and for utilizing the separated components to selectively apply code pulses to said reverse count inputs; and means coupling said counting mechanism to said secrecy device to effect actuation thereof.

References Cited in the file of this patent

UNITED STATES PATENTS 2,883,449 Eilers et al. ............ Apr. 21, 1959

OTHER REFERENCES

1956 IRE National Convention Record, Part 7, page 173 (by Roschke et al.), March 19–22, 1956.